United States Patent [19]
Vogt

[11] 3,770,326
[45] Nov. 6, 1973

[54] HYDRAULIC BRAKING SYSTEMS FOR VEHICLES

[75] Inventor: Hans Josef Vogt, Vallendar, Germany

[73] Assignee: Girling Limited, Birmingham, England

[22] Filed: Mar. 1, 1972

[21] Appl. No.: 230,749

[30] Foreign Application Priority Data
Mar. 19, 1971 Great Britain..................... 7,403/71

[52] U.S. Cl.................................. 303/6 C, 188/349
[51] Int. Cl............................................. B60f 15/02
[58] Field of Search ......................... 303/6 C, 22 R; 188/349, 195

[56] References Cited
UNITED STATES PATENTS
3,147,046  9/1964  Stelzer .............................. 303/6 C Primary Examiner—George E. A. Halvosa
Assistant Examiner—S. D. Basinger
Attorney—Samuel Scrivener, Jr. et al.

[57] ABSTRACT

In a brake control unit for an hydraulic braking system a differential piston works in a stepped bore of complementary outline, and an inertia-controlled valve member is adapted to engage with a seating in the end of the piston which is of smaller area to cut-off communication between an inlet and an outlet when the deceleration of a vehicle in which the unit is incorporated exceeds a predetermined value. A stop is incorporated to limit movement of the valve member with the piston in a direction towards the end of the bore which is of greater area when the seating is moved in that direction in response to an increase in fluid pressure at the inlet which acts on the end of the piston which is of smaller area.

4 Claims, 1 Drawing Figure

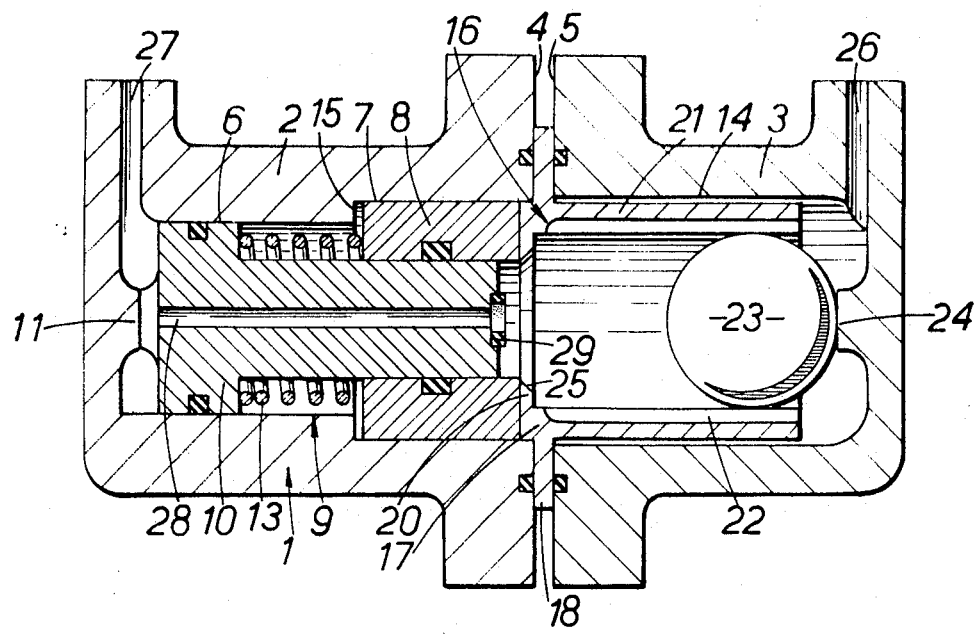

HYDRAULIC BRAKING SYSTEMS FOR VEHICLES

SPECIFIC DESCRIPTION

This invention relates to brake control units for hydraulic braking systems for vehicles of the kind comprising a housing having an inlet for connection to a master cylinder and an outlet for connection to at least one hydraulic actuator of a wheel brake, a piston working in a bore in the housing and having a longitudinally extending passage normally providing communication between the inlet and the outlet, an inertia-controlled valve member located in a chamber in the housing between the inlet and one end of the piston, and a seating in the said one end of the piston surrounding the passage and with which the valve member is engageable to cut-off communication between the inlet and the outlet when the deceleration of the vehicle in which the unit is incorporated exceeds a predetermined value.

According to our invention in a brake control unit of the kind set forth the piston comprises a differential piston working in the bore which is of complementary stepped outline, and the seating is provided in the end of the piston which is of smaller area, a stop being provided in the housing to limit movement of the valve member with the piston in a direction towards the end of the bore of greater area when the seating is moved in that direction in response to an increase in fluid pressure applied to the inlet and acting on the end of the piston of smaller area whereby the outlet is again placed in communication with the inlet through the passage.

Thus the supply of pressure fluid to the actuator is cut-off by the engagement of the valve member with the seating when the deceleration of the vehicle exceeds a predetermined value and the brake is reapplied automatically in response to an increase in the master cylinder pressure which moves the seating away from the then stationary valve member.

Re-application of the brake continues until the increased pressure which is applied to the actuator and which also acts on opposite ends of the differential piston to move in the opposite direction, due to the difference in its areas, with the result that the seating engages again with the stationary valve member to cut-off the supply of pressure fluid to the actuator.

This sequence of operations is repeated automatically whilst the master cylinder is being operated at any one time, and each pressure re-application of the wheel brake takes place at a slightly increased pressure.

Preferably the stop comprises an inwardly directed annular shoulder located in the housing between the end of the bore of smaller area and the adjacent end of the chamber in which the inertia controlled member is located.

One embodiment of our invention is illustrated in the accompanying drawing which is a longitudinal section through a brake control unit in accordance with our invention.

In the control valve illustrated in the accompanying drawings 1 is a housing which is constructed from complementary housing parts 2 and 3 of which adjacent end faces 4 and 5 are clamped together. The housing part 2 is provided with a longitudinal bore 6 which extends inwardly from its inner end, and the bore 6 is counter-bored at 7 to receive an annular sleeve 8 of an internal diameter less than that of the bore 6. The internal surface of the sleeve 8 and the bore 6 define a stepped bore 9 in which works a differential piston 10. The differential piston 10 is normally urged towards a stop 11 at the closed outer end of the housing part 2 by means of a compression spring 13 acting between the portion of the piston 10 which is of greater diameter and the adjacent end of the sleeve 8.

The housing part 3 is provided with a longitudinal bore 14 concentric with and of a diameter substantially equal to that of the counterbore 7.

The sleeve 8 is of an axial length slightly less than that of the counterbore 7 and is preferably clamped against a shoulder 15 in the housing part 2 at a step in the change in diameter between the bore 6 and the counterbore 7 by means of a stop member 16. The stop member 16 comprises an axially extending collar 17 formed at an intermediate point in its length with an outwardly directed radial flange 18 which is clamped between, and in sealing engagement with, the adjacent end faces of the housing parts 2 and 3, and an inwardly directed radial flange 20 which engages with the outer end of the sleeve 8 to clamp the sleeve 8 against the shoulder 15. The internal diameter of the flange 20 is substantially equal to that of the sleeve 8.

A sleeve 21 is carried by or is integral with the end face of the collar 18 remote from the sleeve 8 and extends axially into the bore 14 in the housing part 3. A series of circumferentially spaced ribs 22 formed in the internal face of the sleeve 21 define tracks between which is guided an inertiacontrolled valve member in the form of a ball 23 located within the bore 14 which defines a chamber. The ball 23 is movable in the chamber 14 on the tracks 22 through an axial distance between the stop member 16 and a stop 24 at the closed end of the housing part 3. As illustrated, the innermost end of the face of the flange 20 remote from the sleeve 8 is of discontinuous arcuate outline concentric with and equal in diameter to that of the ball 23 to form a stop face 25 with which the ball 23 is adapted to engage. Gaps in the stop face 25 provide passages for fluid when the ball is in engagement with the stop face.

The closed outer end of the housing part 3 is formed with a radial passage 26 communicating with the bore 14, and the closed outer end of the housing part 2 is formed with a radial passage 27. Normally the passages 26 and 27 are in communcation through a longitudinally extending axial bore 28 in the piston 10, and a valve seating 29 surrounding the bore 28 is provided at the inner end of the piston 10 which is of smaller diameter.

The brake control unit is mounted in a vehicle in an inclined position with the closed end of the housing portion 11 at the forward end. The passage 27 is connected to hydraulic actuators of wheel brakes, normally the brakes on the rear wheels of the vehicle.

In the normal "off" position of brakes the components of the control unit assume the positions shown in the drawings with the ball 23 spaced from the seating 29 and resting against the stop 24 under the influence of gravity, and the differential piston 10 urged into engagement with the stop 11 by the force in the spring 13. When the master cylinder is operated to apply the brakes and the deceleration of the vehicle is below a predetermined value required to cause the ball 23 to engage with the seating 29, fluid under pressure is delivered to the brake actuators through the chamber 14, the axial bore 28 in the piston 10, the bore 6, the outlet passage 27. At the same time the master cylinder pressure is acting on the smaller end of the differential piston 10 and the pressure applied to the brakes is acting on the larger end. So long as the ball 23 does not engage with the seating 29 these pressures are equal. Owing to the differential areas of the two ends of the piston 10, the piston 10 is moved progressively towards the smaller end of the stepped bore in response to increases in pressure and against the action of the spring 13 in which energy is stored until the smaller end of the piston 10 is substantially aligned with the stop face 25. When this occurs a predetermined minimum pressure is applied to the outlet passage 27.

When the deceleration of the vehicle exceeds the prederermined value the ball 23 moves into engagement with the seating 29 and cuts off direct communication between the master cylinder and the brake actuators, at the same time engaging with, or being placed in close proximity to, the stop face 25.

Any increase in the pressure of the fluid supplied by the master cylinder then acts on the smaler end of the differential piston 10 and, with the assistance of the spring 13, moves the piston 10 towards the larger end of the stepped bore 9 against the pressure already existing in the larger end of the bore 9 which is the pressure applied to the hydraulic actuators. During this movement of the piston 10 the ball is in engagement, or engages, with the stop face 25. Thus the valve seating 29 moves out of engagement with the ball 23 so that the increased master cylinder pressure is applied to the brake actuators through the axial bore 28 in the piston 10 and the rear wheel brakes are re-applied automatically.

The increased pressure applied to the brakes also acts on the opposite end of the differential piston 10 and, owing to the differential areas of the two ends of the piston 10, causes the piston 10 to move towards the smaller end of the stepped bore 9 with the result that the seating 29 engages with the ball 23 to cut-off again the supply of pressure fluid to the brake actuators.

The sequence of operations described above is repeated automatically upon each successive increase in master cylinder pressure during any one brake application, and each successive re-application of the rear wheel brakes takes place at a progressively increased pressure.

The ball 23 may move towards the seating 29 under the influence of forces other than those produced when the deceleration of the vehicle, in response to a brake application, exceeds a predetermined value. For example the ball 23 may move towards the seating 29 when the control unit is tilted excessively due to deflections of the suspension of the vehicle in which it is installed. Alternatively the ball 23 may move towards the seating 29 due to the impingement on the ball 23 of high pressure fluid when the master cylinder is operated rapidly. In either of these cases movement of the ball 23 towards the seating 29 is arrested by the provision of the stop face 25 which prevents the ball 29 from engaging with the seating 29 which, at that time, is disposed in the retracted position shown in the drawings by the force in the spring 13 holding the differential piston 10 against the stop at the closed end of the stepped bore 9.

When the ball 23 engages with the stop face 25 due to the influence of suspension movements when the brake is applied by operation of the master cylinder, fluid under pressure passes to the brake actuators of the rear wheel brakes through the axial bore 28 in the piston 10. The brakes are applied until the hydraulic pressures which acts on oppste ends of the differential piston 10 attains a value sufficient to apply to the piston 10, due to the differential areas of the ends of the piston 10, a force of a magnitude sufficient to move the piston 10 towards the smaller end of the stepped bore 9 and urge the seating 29 into engagement with the ball 23. The supply of fluid to the brake actuators is thus cut-off. Any subsequent increase in the applied fluid pressure from the master cylinder applied to the smaller end of the piston 10 serves to re-apply the brakes in successive stages as described above.

Should the ball 23 move towards the seating 29 due to the effect of high pressure fluid fron the master cylinder, such high pressure fluid is supplied to the brake actuators through the axial bore 28 until that pressure attains a value sufficient to cause the differential piston 10 to move towards the smaller end of the stepped bore 9 so that the seating 29 engages with the ball 23 to cut off the supply of pressure fluid to the actuators of the rear brakes. Thereafter re-application of the brakes in response to further increase in master cylinder pressure takes place as described above.

The value of the pressure at which the seating 29 is operative to engage with the ball 23 is chosen to be consistent with subjecting the vehicle to the said predetermined value of deceleration at which the ball 23 would normally be urged towards the seating 29 under the influence of inertia forces.

I claim:

1. A brake control unit for an hydraulic braking system for a vehicle comprising a housing having an inlet for connection to a master cylinder and an outlet for connection to at least one hydraulic actuator of a wheel brake, means defining a bore in said housing, a piston working in said bore and having a longitudinally extending passage normally providing communication between said inlet and said outlet, means defining a chamber in said housing between said inlet and one end of said piston, an inertia-controlled valve member located in said chamber, and a seating in the said one end of said piston surrounding said passage and with which said valve member is engageable to cut-off communication between said inlet and said outlet when the deceleration of a vehicle in which said unit is incorporated exceeds a predetermined value, wherein said piston comprises a differential piston working in said bore which is of complementary stepped outline, said piston having a first end of greater area and a second end of smaller area and said seating being provided in said second end of said piston, and a stop is provided in said housing to limit movement of said valve member with said piston in a direction towards an end of said bore which is of greater area when said seating is moved in that direction in response to an increase in fluid pressure applied to said inlet and acting on said second end of said piston whereby said outlet is again placed in communcation with said inlet through said passage, said stop being fixed with respect to said housing and said piston being movable with respect to said stop, and spring means are incorporated normally to act in a direction to urge said differential piston away from said stop.

2. A brake control unit as claimed in claim 1, wherein said stop comprises an inwardly directed annular shoulder located in said housing between an end of said bore which is of smaller area and an adjacent end of said chamber.

3. A brake control unit as claimed in claim 1, wherein said inertia-controlled valve member comprises a ball and said stop comprises a face of arcuate outline concentric with and equal in diameter to that of said ball.

4. A brake control unit for an hydraulic braking system for a vehicle comprising a housing having an inlet for connection to a master cylinder and an outlet for connection to at least one hydraulic actuator of a wheel brake, means defining a bore in said housing, a piston working in said bore and having a longitudinally extending passage normally providing communcation between said inlet and said outlet, means defining a chamber in said housing between said inlet and one end of said piston, an inertia-controlled valve member located in said chamber, and a seating in the said one end of said piston surrounding said passage and with which said valve member is engageable to cut-off communication between said inlet and said outlet when the deceleration of a vehicle in which said unit is incorporated exceeds a predetermined value, wherein said piston comprises a differential piston working in said bore which is of complementary stepped outline, said piston having a first end of greater area and a second end of smaller area and said seating being provided in said second end of said piston, and a stop is provided in said housing to limit movement of said valve member with said piston in a direction towards and end of said bore which is of greater area when said seating is moved in that direction in response to an increase in fluid pressure applied to said inlet and acting on said second end of said piston whereby said outlet is again placed in communication with said inlet through said passage, and wherein said inertia-controlled valve member comprises a ball and said stop comprisess a face of arcuate outline concentric with and equal in diameter to that of said ball, said face of arcuate outline being provided with gaps defining passages for fluid from said inlet to act on said second end of said piston when said inertia-controlled valve member is in engagement with said stop face.

* * * * *